(12) United States Patent
Furushima

(10) Patent No.: US 10,295,976 B2
(45) Date of Patent: May 21, 2019

(54) SYSTEM DEVELOPMENT DEVICE, SYSTEM DEVELOPMENT METHOD, AND SYSTEM DEVELOPMENT PROGRAM

(71) Applicant: Hiroyuki Furushima, Tokyo (JP)

(72) Inventor: Hiroyuki Furushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 14/766,818

(22) PCT Filed: Feb. 22, 2013

(86) PCT No.: PCT/JP2013/054530
§ 371 (c)(1),
(2) Date: Aug. 10, 2015

(87) PCT Pub. No.: WO2014/128920
PCT Pub. Date: Aug. 28, 2014

(65) Prior Publication Data
US 2016/0004239 A1    Jan. 7, 2016

(51) Int. Cl.
*G05B 19/042*    (2006.01)
*H04L 29/06*    (2006.01)

(52) U.S. Cl.
CPC .......... *G05B 19/042* (2013.01); *H04L 63/083* (2013.01); *G05B 2219/23258* (2013.01); *Y02P 90/265* (2015.11)

(58) Field of Classification Search
CPC ........ G05B 19/042; G05B 2219/23258; H04L 63/083; Y02P 90/265
See application file for complete search history.

(56) References Cited

U.S. PATENT DOCUMENTS 5,168,441 A * 12/1992 Onarheim .......... G05B 19/0426
700/17
5,321,829 A *  6/1994 Zifferer ............... G05B 19/056
700/18
(Continued)

FOREIGN PATENT DOCUMENTS

DE    112010005023 T5    10/2012
JP         7-36680 A     2/1995
(Continued)

OTHER PUBLICATIONS

Decision of a Patent Grant for Japanese Patent Application No. 2015-501187, dated May 19, 2015.
(Continued)

*Primary Examiner* — Jason Lin
(74) *Attorney, Agent, or Firm* — Sughrue Mion, PLLC; Richard C. Turner

(57) ABSTRACT

A system development device includes a storage unit that stores therein an object information list, in which an entry is registered for each constituent element that constitutes a single control system, where the entry includes an object type of a constituent element, includes connection information, and includes setting information; a system-configuration displaying and editing unit that generates a workspace display screen for each object information list, where the workspace display screen connects and displays, a display object according to the object type of each entry registered in the object information list; and a dividing unit that, when the system-configuration displaying and editing unit receives a dividing command designating any second system included in a first system, duplicates an entry of the second system that is registered in a first object information list of the first system and that generates a second object information list.

23 Claims, 16 Drawing Sheets

(56) References Cited

U.S. PATENT DOCUMENTS

| | | | | |
|---|---|---|---|---|
| 5,408,603 A * | 4/1995 | Van de Lavoir | ........ | G06F 9/451 715/763 |
| 5,838,588 A * | 11/1998 | Santoso | ................ | F01K 13/02 700/287 |
| 6,006,328 A * | 12/1999 | Drake | ................ | G06F 21/14 713/188 |
| 6,477,435 B1 * | 11/2002 | Ryan | ................ | G05B 19/0426 700/182 |
| 6,973,649 B1 * | 12/2005 | Pazel | ................ | G06F 8/34 715/763 |
| 7,275,236 B1 | 9/2007 | Kabe | | |
| 8,843,885 B2 | 9/2014 | Nakai et al. | | |
| 8,849,429 B2 * | 9/2014 | Ojha | ................ | G05B 19/042 700/17 |
| 2002/0101431 A1 * | 8/2002 | Forney | ................ | G06F 17/30873 345/582 |
| 2003/0084201 A1 * | 5/2003 | Edwards | ................ | G05B 19/00 719/328 |
| 2004/0075689 A1 * | 4/2004 | Schleiss | ................ | G05B 15/02 715/771 |
| 2004/0267515 A1 * | 12/2004 | McDaniel | ................ | G05B 19/0426 703/22 |
| 2005/0102651 A1 * | 5/2005 | Ueda | ................ | G05B 19/056 717/113 |
| 2006/0190105 A1 * | 8/2006 | Hsu | ................ | G06F 8/34 700/86 |
| 2008/0234986 A1 * | 9/2008 | Chen | ................ | G05B 19/41885 703/1 |
| 2009/0118845 A1 | 5/2009 | Eldridge et al. | | |
| 2009/0327942 A1 * | 12/2009 | Eldridge | ................ | G06F 8/34 715/771 |
| 2010/0123722 A1 * | 5/2010 | Grubbs | ................ | G05B 19/0426 345/473 |
| 2012/0066265 A1 * | 3/2012 | Li | ................ | G06Q 10/103 707/792 |
| 2012/0222001 A1 | 8/2012 | Nakai et al. | | |

FOREIGN PATENT DOCUMENTS

| | | |
|---|---|---|
| JP | 9-282014 A | 10/1997 |
| JP | 2000-207185 A | 7/2000 |
| JP | 2001-325010 A | 11/2001 |
| JP | 2002-328706 A | 11/2002 |
| JP | 2005-84773 A | 3/2005 |
| JP | 2007-48231 A | 2/2007 |
| JP | 2007-213203 A | 8/2007 |
| JP | 2008-234379 A | 10/2008 |
| JP | 2010-122716 A | 6/2010 |
| WO | 02/42853 A1 | 5/2002 |

OTHER PUBLICATIONS

International Search Report of PCT/JP2013/054530, dated Mar. 26, 2013. [PCT/ISA/210].

Communication dated May 4, 2016 from the German Patent and Trademark Office in counterpart application No. 112013006481.2.

* cited by examiner

FIG.4

OBJECT INFORMATION LIST 73

| OBJECT ID | OBJECT NAME | OBJECT TYPE | CONNECTION INFORMATION | JUMP-DESTINATION INFORMATION | JUMP-DESTINATION ID | OBJECT SUPPLEMENTARY INFORMATION (DISPLAY INFORMATION, SETTING INFORMATION, AND ALLOCATION INFORMATION) |
|---|---|---|---|---|---|---|
| 1 | CONT_A | CONT | 2 | - | - | |
| 2 | NET_A | NET | 1,3,4 | - | - | |
| 3 | CONT_B | CONT | 2 | - | - | |
| 4 | HMI_A | HMI | 2 | - | - | |

FIG.9

| OBJECT ID | OBJECT NAME | OBJECT TYPE | CONNEC-TION INFORMA-TION | JUMP-DESTINA-TION INFORMA-TION | JUMP-DESTINA-TION ID | OBJECT SUPPLEMENTARY INFORMATION (DISPLAY INFORMATION, SETTING INFORMATION, AND ALLOCATION INFORMATION) |
|---|---|---|---|---|---|---|
| | | | | | | |
| | | | | | | |
| | | | | | | |
| | | | | | | |

OBJECT INFORMATION LIST (WS NAME: WS_B, WS ID: BBB) 73

FIG.10

OBJECT INFORMATION LIST
(WS NAME: WS_B, WS ID: BBB)
73

| OBJECT ID | OBJECT NAME | OBJECT TYPE | CONNEC-TION INFORMA-TION | JUMP-DESTINA-TION INFORMA-TION | JUMP-DESTINA-TION ID | OBJECT SUPPLEMENTARY INFORMATION (DISPLAY INFORMATION, SETTING INFORMATION, AND ALLOCATION INFORMATION) |
|---|---|---|---|---|---|---|
| 1 | CONT_B | CONT | 2 | AAA | 3 | |
| 2 | JUMP_A | JUMP | 1 | AAA | - | |
| | | | | | | |
| | | | | | | |

FIG.11

| OBJECT ID | OBJECT NAME | OBJECT TYPE | CONNECTION INFORMATION | JUMP-DESTINATION INFORMATION | JUMP-DESTINATION ID | OBJECT SUPPLEMENTARY INFORMATION (DISPLAY INFORMATION, SETTING INFORMATION, AND ALLOCATION INFORMATION) |
|---|---|---|---|---|---|---|
| 1 | CONT_A | CONT | 2 | - | - | |
| 2 | NET_A | NET | 1,3,4 | - | - | |
| 3 | CONT_B | JUMP | 2 | BBB | 1 | |
| 4 | HMI_A | HMI | 2 | - | - | |

OBJECT INFORMATION LIST (WS NAME: WS_A, WS ID: AAA) 73

FIG.14

OBJECT INFORMATION LIST
(WS NAME: WS_B, WS ID: BBB)
73

| OBJECT ID | OBJECT NAME | OBJECT TYPE | CONNEC-TION INFORMA-TION | JUMP-DESTINA-TION INFORMA-TION | JUMP-DESTINA-TION ID | OBJECT SUPPLEMENTARY INFORMATION (DISPLAY INFORMATION, SETTING INFORMATION, AND ALLOCATION INFORMATION) |
|---|---|---|---|---|---|---|
| 1 | CONT_B | CONT | 2 | AAA | 3 | |
| 2 | JUMP_A | JUMP | 1 | AAA | - | |
| 3 | CONT_X | CONT | 4 | - | - | |
| 4 | NET_X | NET | 1,3 | - | - | |

FIG.17

OBJECT INFORMATION LIST
(WS NAME: WS_A, WS ID: AAA)
73

| OBJECT ID | OBJECT NAME | OBJECT TYPE | CONNECTION INFORMATION | JUMP-DESTINATION INFORMATION | JUMP-DESTINATION ID | OBJECT SUPPLEMENTARY INFORMATION (DISPLAY INFORMATION, SETTING INFORMATION, AND ALLOCATION INFORMATION) |
|---|---|---|---|---|---|---|
| 1 | CONT_A | CONT | 2 | - | - | |
| 2 | NET_A | NET | 1,3,4 | - | - | |
| 3 | CONT_B | CONT | 2 | - | - | |
| 4 | HMI_A | HMI | 2 | - | - | |
| 5 | CONT_X | CONT | 6 | - | - | |
| 6 | NET_X | NET | 3,6 | - | - | |

SYSTEM DEVELOPMENT DEVICE, SYSTEM DEVELOPMENT METHOD, AND SYSTEM DEVELOPMENT PROGRAM

CROSS REFERENCE TO RELATED APPLICATIONS

This application is a National Stage of International Application No. PCT/JP2013/054530 filed Feb. 22, 2013, the contents of all of which are incorporated herein by reference in their entirety.

FIELD

The present invention relates to a system development device, a system development method, and a system development program that support the development of a control system used in the field of FA.

BACKGROUND

There is a case where a control system used in the field of FA is configured by a plurality of devices, with the devices being connected through a network. For example, programmable logic controllers (PLC) or programmable display devices (human machine interface (HMI)) are applicable as the devices that constitute the control system. In recent years, there has been a trend for control systems to become increasingly large. Such development of large control systems is done by multiple companies or teams. These companies or teams concurrently develop the respective development areas for which they are responsible. This makes it possible to develop control systems in short periods.

As a technique for dividing the control system into functions, Patent Literature 1, for example, has disclosed a technique for dividing a program into functions on a PLC-by-PLC basis and allocating a divided program to individual PLCs without taking the interface between the PLCs into account.

CITATION LIST

Patent Literature

Patent Literature 1: Japanese Patent Application Laid-open No. H9-282014

SUMMARY

Technical Problem

Unless various kinds of network-setting information are set for connecting individual devices that constitute the control system to a network, the control system will not operate properly. The network-setting information depends on communication modes. The network-setting information as described above is decided by an organization (hereinafter, "requester") that arranges the development. A team or company, also known as a requestee, that is requested to develop a section receives necessary information for the development of the section for which they are responsible, including the network-setting information, from the requester and thereafter starts development of that section.

Furthermore, there is a system development program that supports development of a control system configured by connecting devices through a network. According to the system development program, it is possible to centralize the management of setting information of one or more PLCs and one or more HMIs that constitute the control system and the management a program that operates each of the devices. A management environment in the system development program is referred to as "workspace". By performing various operations on a workspace, an operator can set, edit, and check a list of devices (a device list) that constitute the target control system managed through the workspace, a connection relation between the devices (connection information), and setting information or a user program that operates a device or a unit that constitutes the device. These pieces of information managed through the workspace are collectively referred to as "system-configuration information" (or "workspace information"). That is, the workspace functions as a management segment and a development segment of the control system.

When development of the control system is performed by using the system development program, first, a requester performs an upstream design on a single workspace including setting a list of devices that constitute the control system; setting network-setting information; and setting connection-information settings. In the upstream design, there may be a case where more settings are performed because information from a past system-configuration is utilized or because of other reasons. The workspace is divided into development areas that are the responsibility of respective requestees; and the divided workspaces are distributed to the respective requestees. Dividing of the workspace is performed for the purpose of hiding, for example, sections other than their own development area from the requestee.

Dividing of the workspace is accompanied with the dividing of a portion of the system-configuration information. This raises a problem in that a heavy burden is placed on an operator (a user) at the requester end.

The present invention has been achieved to solve the above problems, and an objective of the present invention is to provide a system development device, a system development method, and a system development program that can divide divisions into system development segments through an easy input operation.

Solution to Problem

In order to solve the problem and achieve the objective mentioned above, the present invention relates to a system development device that supports development of a system configured by connecting constituent elements to each other, the constituent elements including a device to which setting information for controlling operation thereof is set. The system development device includes: a storage unit that stores therein constituent-element information lists, in each of which an entry is registered for each constituent element that constitutes a single system, the entry including type information of a constituent element, connection information in which a connection destination of the corresponding constituent element is described, and setting information that is set to the corresponding constituent element; a system-configuration displaying and editing unit that generates a display screen for each of the constituent-element information lists, the display screen connecting and displaying a display object according to the type information of each entry registered in the constituent-element information list on the basis of the connection information, and also receiving an edit input to the display object, and that reflects an edit input received through the display screen in a corresponding constituent-element information list; and a dividing unit that, when the system-configuration displaying and editing unit receives a dividing command designating any second system included in a first system, duplicates an entry of the second system, which is registered in a first constituent-element information list of the first system, and generates a second constituent-element information list.

Advantageous Effects of Invention

The system development device according to the present invention divides a development environment only by inputting a dividing command, and therefore operator's workload is reduced when a control system is divided into development segments. That is, the system development device according to the present invention can divide a control system into development segments by a means that only requires easy inputting.

BRIEF DESCRIPTION OF DRAWINGS

FIG. 4 is an explanatory diagram of a data structure example of an object information list.

FIG. 9 is a diagram illustrating an object information list immediately after having been set in workspace information of a division destination.

FIG. 10 is a diagram illustrating an object information list of a division destination in a state where a division is completed.

FIG. 11 is a diagram illustrating an object information list of a division source in a state where the division is completed.

FIG. 14 is a diagram illustrating an object information list corresponding to a workspace after development of a division destination.

FIG. 17 is a diagram illustrating an object information list of a division source in a merging completion state.

DESCRIPTION OF EMBODIMENTS

Exemplary embodiments of system configuration information according to the present invention will be explained below in detail with reference to the accompanying drawings. Note that the present invention is not limited to the embodiments.

Embodiment

Figure 1:
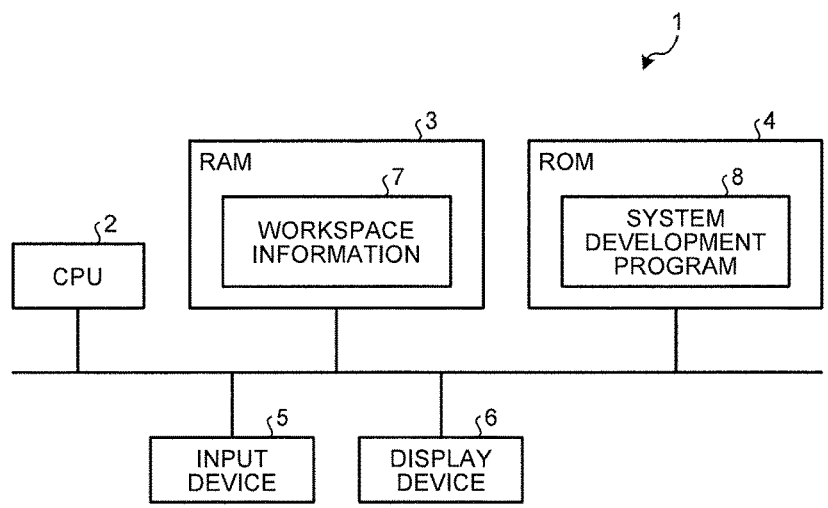
FIG. 1 is a diagram illustrating a configuration of a system development device according to an embodiment of the present invention.

FIG. 1 is a diagram illustrating a configuration of a system development device according to an embodiment of the present invention. As illustrated in FIG. 1, a system development device 1 has a configuration identical to generally used computers, and it includes a central processing unit (CPU) 2, a random access memory (RAM) 3, a read only memory (ROM) 4, an input device 5, and a display device 6. The CPU 2, the RAM 3, the ROM 4, the display device 6, and the input device 5 are connected to each other through a bus line.

The display device 6 is constituted, for example, by a liquid crystal monitor. On the basis of a command from the CPU 2, the display device 6, such as an operation screen, displays output information to a user. The input device 5 is configured to include a mouse and a keyboard. An operation of the system development device 1 by an operator is input to the input device 5. Operation information that is input to the input device 5 is transmitted to the CPU 2.

The ROM 4 is a recording medium that stores therein in advance a system development program 8 that is a program according to the embodiment of the present invention. The system development program 8 is loaded from the ROM 4 to the RAM 3 through the bus line. The CPU 2 executes the system development program 8 loaded into the RAM 3. Specifically, in the system development device 1, according to a command input from the input device 5 by an operator, the CPU 2 reads the system development program 8 from the ROM 4, and it develops it in a program storage area in the RAM 3 to perform various processes.

As a part of the processes in accordance with the system development program 8, the CPU 2 can provide a workspace for an operator. The workspace is a working environment that can develop and manage a control system. The workspace is created for each target control system to be developed and managed. The CPU 2 can cause the display device 6 to display a workspace display screen for displaying system-configuration information (workspace information 7) of the control system.

Figure 2:
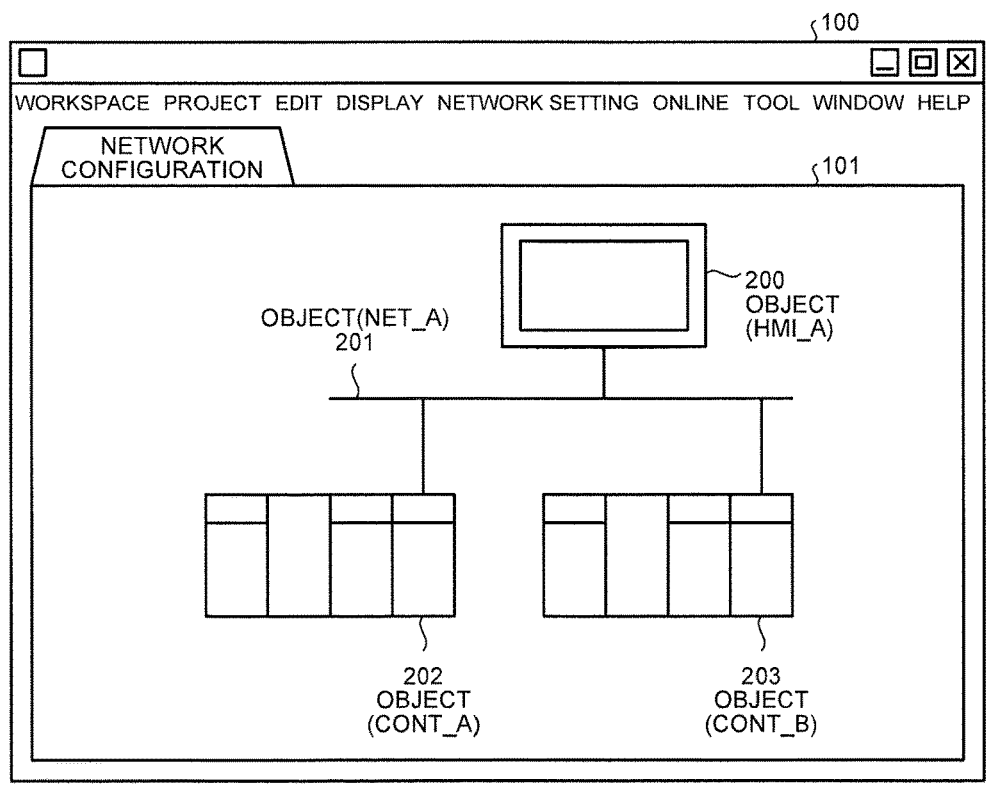
FIG. 2 is a diagram illustrating a display example of a workspace display screen.

FIG. 2 is a diagram illustrating a display example of the workspace display screen. As illustrated in FIG. 2, a main screen 100 provided by the system development program 8 is displayed on the display device 6. The main screen 100 includes a workspace display screen 101. An operator can, by operating the input device 5 while viewing the workspace display screen 101, add or delete a display object (hereinafter, simply "object") displayed on the workspace display screen 101. The object described herein refers to a component displayed on the workspace display screen 101. The object illustrates a constituent element that constitutes the control system. The constituent element that constitutes the control system includes a device (for example, a PLC and an HMI) and a network. In the example in FIG. 2, an object 200 indicating an HMI named "HMI_A", an object 201 indicating a network named "NET_A", an object 202 indicating a PLC named "CONT_A", and an object 203 indicating a PLC named "CONT_B" are displayed. The object 200, the object 202, and the object 203 that are respectively connected to the object 201 are displayed. This connection relation between the objects corresponds to connections of the HMI HMI_A, the PLC CONT_A, and the PLC CONT_B respectively to the network NET_A. That is, the workspace display screen

101 in FIG. 2 graphically displays a list of devices (a device list) that constitute the control system and information on connections between the devices.

A PLC is a controller that can control a controlled apparatus. In the following descriptions, the expression "controller" indicates a "PLC". As an example, the PLC is configured by mounting a power-supply unit, a CPU unit, and an auxiliary unit that assists the CPU unit to a base unit that is a backplane. Any number of auxiliary units can be mounted to the base unit. The power-supply unit supplies power to various units that constitute the PLC. The CPU unit stores a user program and one or more state variables of a controlled apparatus (devices) stored in its internal memory. The devices are in a one-to-one correspondence with addresses of the memory within the PLC. The PLC operates the values of the state variables (the device values) in accordance with the user program. There are various types of auxiliary units according to their function. For example, an analog unit that outputs an analog-signal command to a controlled apparatus and that inputs an analog-signal response from the controlled apparatus is applicable as an auxiliary unit. A temperature control unit that generates and outputs a temperature control signal according to a temperature value detected by a temperature sensor is also applicable as an auxiliary unit. A robot controller that controls a robot in accordance with a program is also applicable as an auxiliary unit. A network unit for connecting to a network is also applicable as an auxiliary unit. Depending on what function is to be achieved by the user using a PLC, auxiliary units that constitute the PLC are selected. Because two controllers (CONT_A and CONT_B) illustrated in FIG. 2 are connected to the network NET_A, each of the controllers includes at least a network unit. The auxiliary unit outputs a signal to the controlled apparatus depending on a predetermined device, and it writes an input signal from the controlled apparatus to the predetermined device. An HMI can display and operate depending on a device value within the PLC in accordance with a user program installed in advance.

The user program and parameters are set in the CPU. The parameters set in the CPU unit include, for example, a correspondence relation between a device and an address of the memory, or settings of auxiliary units that constitute the PLC to which the CPU unit itself belongs. The user program and the parameters are sometimes collectively expressed as a "project". A project is set to each of the units or devices that operate in accordance with the user program. A target to which a project is set is not limited to the CPU unit. A target for which a project is set includes a robot controller for example, in addition to the CPU unit. Further, a project is set also to an HMI.

Network-setting information is set in the network unit. The network-setting information is information for connecting to a network, which depends on a connection-target network. For example, the network-setting information includes connected-network identifying information and the network unit's own station number in the connected network.

In FIG. 2, the device-list setting and the connection information are graphically displayed on the workspace display screen 101. By operating the input device 5, an operator can call up any information included in the workspace information (for example, network-setting information, or a project that is discussed later) on the workspace display screen 101. The operator can also edit the called-up information.

The CPU 2 temporarily stores therein the workspace information in the RAM 3 (the workspace information 7).

The workspace information 7 includes all the pieces of information set through a workspace. The workspace information 7, for example, includes a device list, connection information, object display information (object color and object display-position coordinates), network-setting information that is set to a device or a unit that constitutes the device, and a project that is set to a device or a unit that constitutes the device. When an editing operation on an object displayed on the workspace display screen 101 is input to the CPU 2, the CPU 2 causes specifics of the edits to be reflected in display specifics on the workspace display screen 101 and also causes the specifics to be reflected in the workspace information 7 on the RAM 3. When a save command is input through the input device 5 to the CPU 2, the CPU 2 can record the workspace information 7 on the RAM 3 in the ROM 4 in a non-volatile manner.

In the following descriptions, the network-setting information and the project are collectively referred to as "setting information". The setting information is not limited to the network-setting information and the project. The concept of setting information includes any information, as long as the information is set to a device or a unit that constitutes the device and it is needed in order to operate the device or the unit that constitutes the device as the setting target.

The workspace information 7 is in a one-to-one correspondence with a workspace. When a workspace-reading command is input to the CPU 2 through the input device 5, the CPU 2 reads the workspace information 7 corresponding to a workspace designated by the reading command from the ROM 4 to the RAM 3; generates the workspace display screen 101 on the basis of the workspace information 7 read to the RAM 3; and can display the workspace display screen 101 on the display device 6.

The system development program 8 can be configured to be stored on a computer connected to a network such as the Internet and to be downloaded via the network so as to be developed in the RAM 3. The system development program 8 can also be configured to be provided or distributed via a network such as the Internet. Further, even when a recording medium that stores therein the system development program 8 in advance is other than the ROM 4, this recording medium is still applicable as long as it is a non-temporary tangible recording medium. For example, a hard disk drive (HDD), a solid state drive (SSD), a CD-ROM, a DVD-ROM, or a removable memory device is applicable as a recording medium that stores therein the system development program 8 in advance.

A technique that is compared with the embodiment of the present invention (a comparative example) is described here. As described previously, in the case where development of a partial area of the control system is outsourced, an applicable area is separated from the workspace of the control system into another workspace, which is provided to a requestee. According to the comparative example, dividing of the workspace is performed along with an operator's manual operation of the workspace information 7. For example, according to the comparative example, when the controller CONT_A is separated into another workspace, an operator not only needs to perform an operation to copy the object 202 of the controller CONT_A from the workspace display screen 101 that displays a division-source workspace to the workspace display screen 101 that displays a new divided workspace (a division-destination workspace), but also needs to manually bring setting information set to units that constitute the controller CONT_A into correspondence with the division-destination workspace and to manually bring the setting information into correspondence with the respective units. In a case where there are multiple requestees, those tasks as described above need to be done multiple times.

After a requestee has completed the development, the division-destination workspace, in which the development has been completed, is delivered to a requester. According to the comparative example, the requester not only needs to perform an operation to copy and overwrite with the object 202 that displays the controller CONT_A from the workspace display screen 101 that displays the delivered division destination workspace to the workspace display screen 101 that displays the division-source workspace, but also needs to perform manual tasks on the workspace information 7 opposite to the work to divide the workspace.

According to the embodiment of the present invention, the system development device 1 can divide a workspace only by designating a separation target and by having a dividing command input by an operator.

Figure 3:
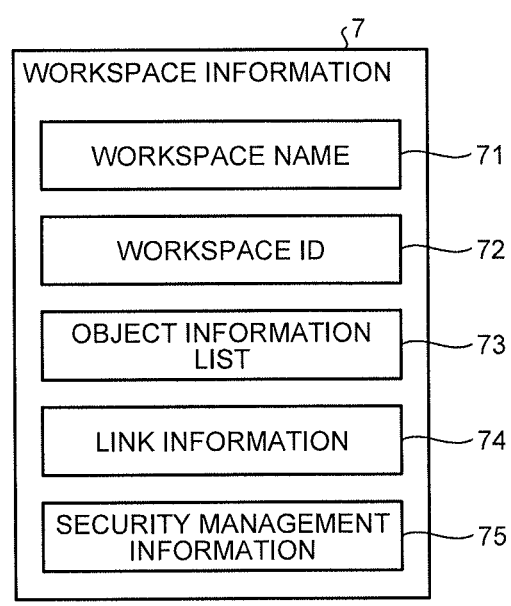
FIG. 3 is a diagram illustrating a data configuration of workspace information according to the embodiment of the present invention.

FIG. 3 is a diagram illustrating the data configuration of the workspace information 7 according to the embodiment of the present invention. As illustrated in FIG. 3, the workspace information 7 includes a workspace name (WS name) 71, a workspace ID (WS_ID) 72, an object information list 73, link information 74, and security management information 75.

The workspace name 71 is a name for identifying a workspace, and it is given by an operator. The operator can set any name as the workspace name 71. The workspace ID 72 is an identifier for identifying a workspace, and it is generated by the system development device 1. The workspace ID 72 is a unique identifier that is set so as to identify one workspace from a group of the considerable number of workspaces.

FIG. 4 is an explanatory diagram of the data structure example of the object information list 73. The object information list 73 illustrated in FIG. 4 corresponds to the workspace illustrated in FIG. 2. The object information list 73 has a data structure in a table format. Individual entries that constitute the object information list 73 are referred to as "object information". The object information includes an object ID, an object name, an object type (type information), connection information, jump-destination information, a jump-destination ID, and object supplementary information. In the object information list 73, an entry is registered for each object. That is, the object information list 73 has a function as a device list.

The object ID is a unique ID within a single workspace, which is generated by the system development device 1. As illustrated in FIG. 4, an object ID "1" is assigned to the object information that is initially registered, and serial-numbered object IDs are assigned to the subsequent object information in the registration order. The object name is a name given by an operator.

The connection information is information indicating a connection-destination object within the same workspace. The connection information is described using the object ID described in the same object information list 73.

The object type indicates the type in which the object is categorized. According to the embodiment of the present invention, the object type includes a jump (JUMP) for example, in addition to a controller (CONT), a network (NET), and an HMI.

When a portion of a control system created by using a single workspace is separated to another workspace, an object categorized into a jump (a jump object) indicates the boundary between sections that are disconnected by the separation. In the embodiment of the present invention, an entry applicable as a separation target in a division-source object information list 73 is copied (duplicated) to a division-destination object information list 73. In the division-source object information list 73, the object type of a duplication-target entry is changed to a jump. A new jump object, provided with connection information indicating that its connection destination is an object of the duplicated entry, is added to the division-destination object information list 73. On the workspace display screen 101, the jump object is displayed in a manner or shape specific to the jump object, that is, in a manner or shape identifiable from other types.

The jump-destination information and the jump-destination ID function in a cooperative manner as information that brings a duplication-source entry and a duplication-destination entry into correspondence with each other (first information and second information). The jump-destination information and the jump-destination ID are referenced when a division-source workspace and a division-destination workspace are merged with each other.

The object supplementary information includes display information (object color and object display-position coordinates), setting information, and allocation information. The setting information includes network-setting information and a project as described previously. The network-setting information is a piece of information that is set to a device managed by an entry to which the object itself belongs, or that is set to a network unit that constitutes the device. In a case where an object indicates a PLC that includes a plurality of network units, the object supplementary information includes a plurality of pieces of network-setting information. The allocation information is information indicating a correspondence relation between a device (a unit included in a PLC when the device is the PLC), indicated by an entry to which the object itself belongs, and setting information set to this device (or the unit included in the device). That is, the setting information as well as the correspondence relation between the setting information and a device or a unit that constitutes the device is managed by the respective entries that constitute the object information list 73.

The link information 74 and the security management information 75 are described later.

Figure 5:
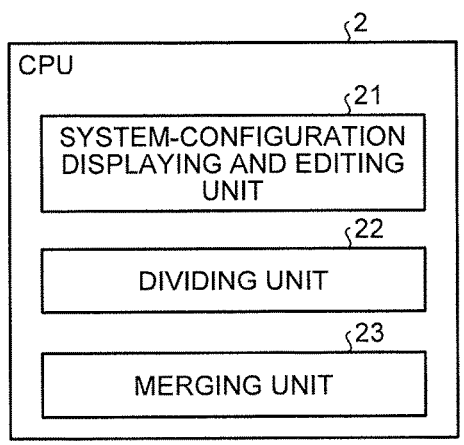
FIG. 5 is a diagram illustrating functions achieved by executing a system development program by a CPU.

FIG. 5 is a diagram illustrating functions achieved by executing the system development program 8 with the CPU 2. As illustrated in FIG. 5, the CPU 2 functions as a system-configuration displaying and editing unit 21, a dividing unit 22, and a merging unit 23.

The system-configuration displaying and editing unit 21 can generate a workspace display screen for each object information list 73, where the workspace display screen connects and displays a display object according to the object type of each entry registered in the object information list 73 on the basis of the connection information, and it also receives an edit input to the display object. The system-configuration displaying and editing unit 21 can also cause the edit input received through the workspace display screen 101 to be reflected in a corresponding object information list 73.

When the system-configuration displaying and editing unit 21 receives a dividing command designating any second system included in a first system, the dividing unit 22 can duplicate an entry of the second system, which is registered in a first object information list 73 of the first system, and can generate a second object information list 73.

When the system-configuration displaying and editing unit 21 receives a merging command to merge the second system into the first system, the merging unit 23 can replace a duplication-source entry in the first object information list 73 with an entry that constitutes the second object information list 73. The merging unit 23 can record a save-location path of the second object information list 73 in the link information 74 of the first system.

Any number of the second systems can be separated from the first system. For example, in the case of issuing a command to separate a system B and a system C from a system A, the relation between the system A and the system B and the relation between the system A and the system C are respectively identical to the relation between the first system and the second system. There can also be a case of issuing a command to separate the system B from the system A and further of issuing a command to separate the system C from this system B. In that case, the relation between the system A and the system B and the relation between the system B and the system C are respectively identical to the relation between the first system and the second system.

Next, an operation of the system development device 1 according to the embodiment of the present invention is described.

Figure 6:
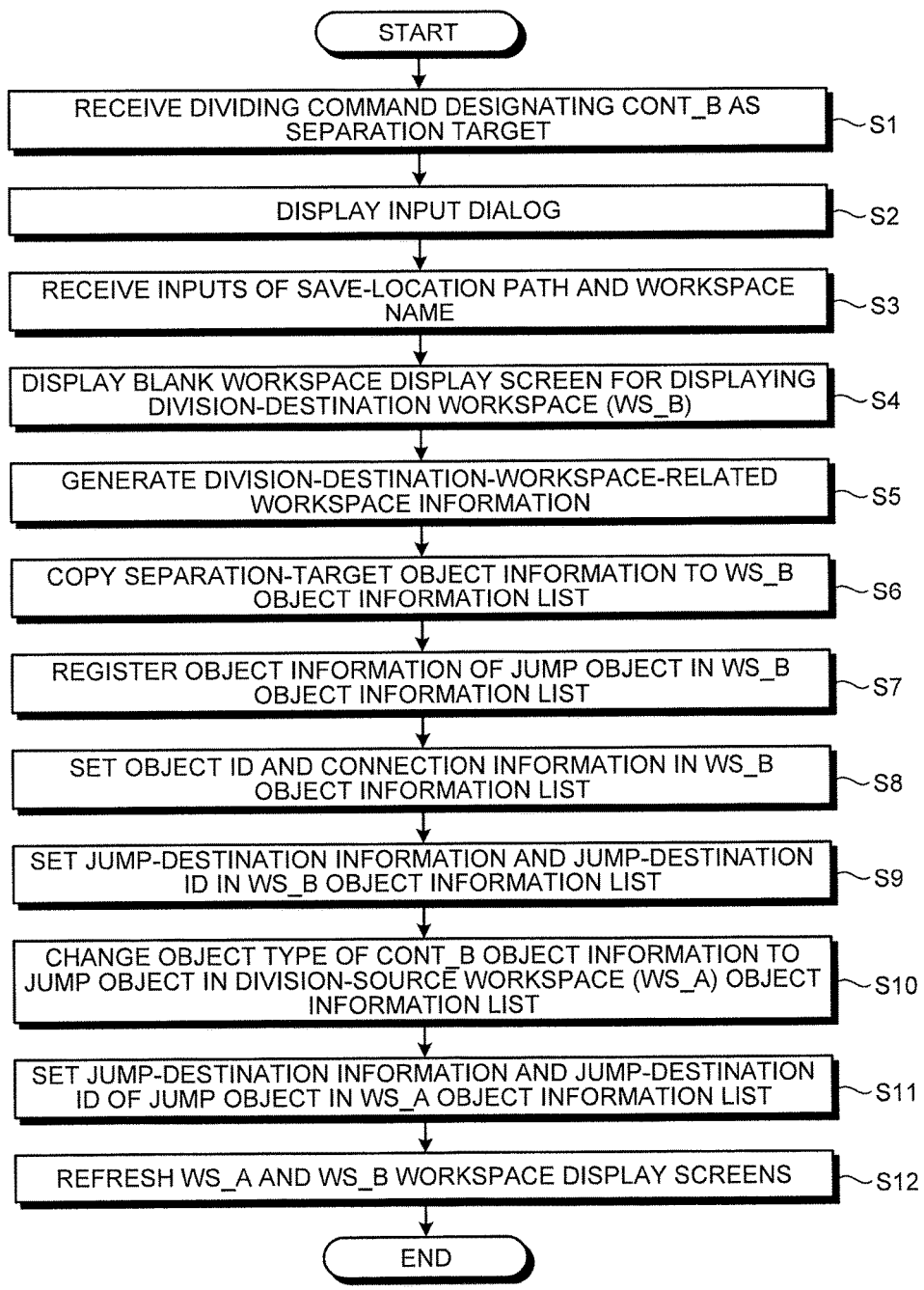
FIG. 6 is a flowchart describing an operation of the system development device for dividing a workspace.
Figure 7:
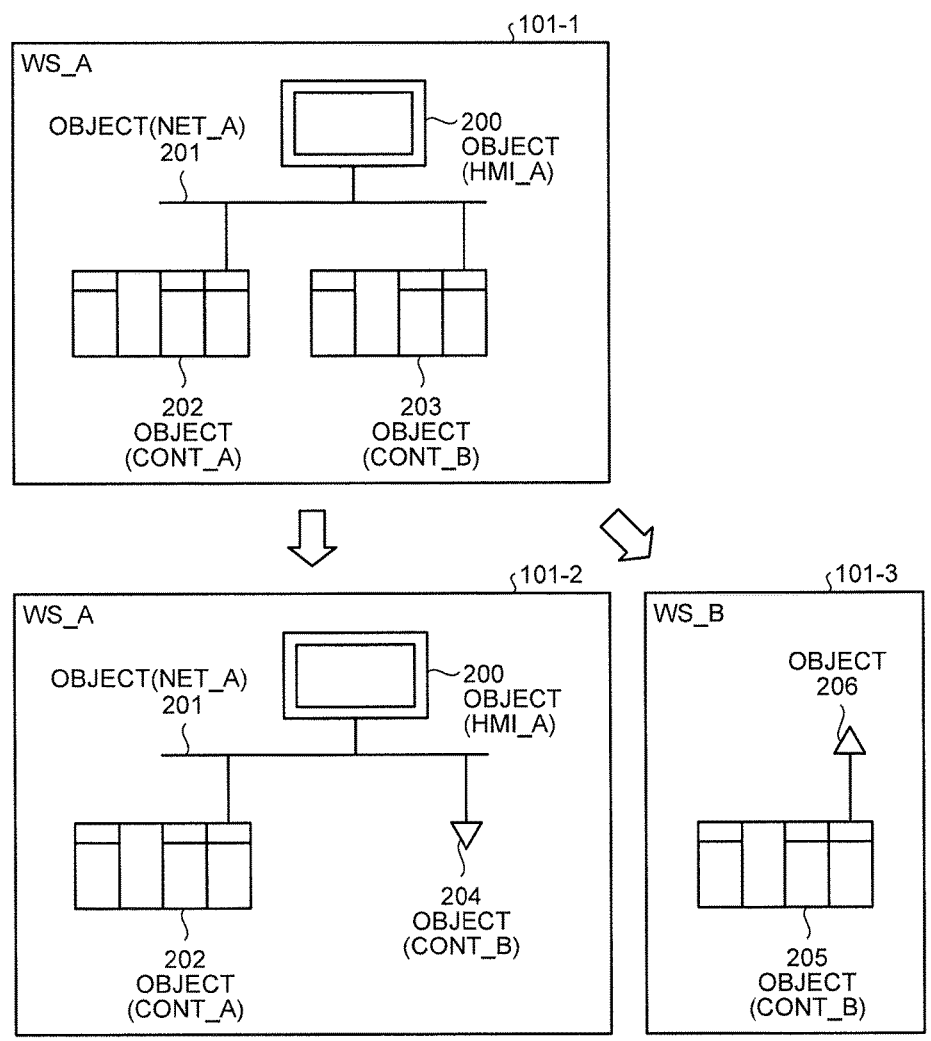
FIG. 7 is an explanatory diagram of a state of a workspace display screen transitioning in conjunction with dividing.

FIG. 6 is a flowchart describing an operation of the system development device 1 for dividing a workspace. FIG. 7 is an explanatory diagram of a state of the workspace display screen 101 transitioning in conjunction with dividing a workspace. A case is described here, in which the controller CONT_B is separated from the system configuration displayed on the workspace display screen 101 illustrated in FIG. 2 (a workspace display screen 101-1 in FIG. 7). The workspace displayed on the workspace display screen 101-1 is given the workspace name 71 that is "WS_A" and the workspace ID 72 that is "AAA". Immediately before dividing the workspace (that is, in a state where the workspace display screen 101-1 is displayed), settings of at least a device list, connection information, and network-setting information have been completed.

The system-configuration displaying and editing unit 21 displays the workspace display screen 101-1 on the display device 6. In this state, by operating the input device 5, an operator can designate a separation-target object and can input a dividing command. The designation of a separation-target object is input according to the area designation on the workspace display screen 101-1, for example. The area designation is executed by, for example, dragging a mouse. For example, when, in a state where the area has been designated, a right click of the mouse is input, the system-configuration displaying and editing unit 21 displays a menu including "divide" and recognizes an input of a dividing command when "divide" is selected from the menu by using the mouse. In this example, the controller CONT_B is designated as a separation target.

When the system-configuration displaying and editing unit 21 receives the dividing command designating the controller CONT_B as a separation target (Step S1), the dividing unit 22 then executes control. The dividing unit 22 displays an input dialog on the main screen 100 (Step S2).

Figure 8:
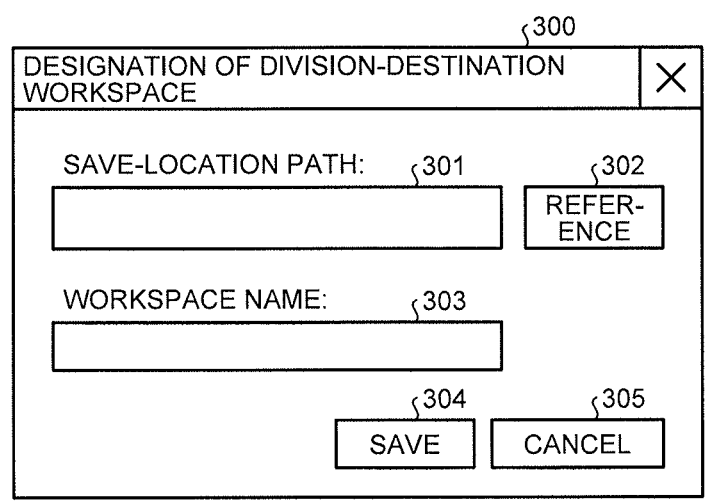
FIG. 8 is a diagram illustrating a display example of an input dialog.

FIG. 8 is a diagram illustrating a display example of the input dialog. As illustrated in FIG. 8, an input dialog 300 includes a save-location-path input field 301, a reference button 302, a workspace-name input field 303, a save button 304, and a cancel button 305. An operator can input a save-location path of a new workspace (a division-destination workspace), in which its management target is the controller CONT_B, to the save-location-path input field 301. The save-location path is information that identifies the position of the save location of the workspace information 7 in a storage device. The reference button 302 is a button that instructs a directory configuration of the storage device to be displayed. By pressing the reference button 302, an operator causes the dividing unit 22 to display the directory configuration of a storage area of the system development device 1 for reference when deciding the save-location path. The operator can also input the workspace name 71 of the division-destination workspace to the workspace-name input field 303. The dividing unit 22, when the save button 304 is pressed, receives the specific content that is input to the save-location-path input field 301 and to the workspace-name input field 303 as triggers. When the cancel button 305 is pressed, the dividing unit 22 can delete a display of the input dialog 300 and transfer the control to the system-configuration displaying and editing unit 21.

Upon reception of the inputs of the save-location path and the workspace name 71 through the input dialog 300 (Step S3), the dividing unit 22 displays a blank workspace display screen 101 for displaying the division-destination workspace (Step S4), and it also generates workspace information 7 related to the division-destination workspace (hereinafter, "division-destination-workspace-related workspace information 7") (Step S5). The process at Step S5 includes setting the workspace name 71, input through the input dialog 300, in the division-destination-workspace-related workspace information 7; generating the workspace ID 72 and setting it in the division-destination workspace information 7; and generating a blank object information list 73 and setting it in the division-destination workspace information 7. In the process at Step S3, the workspace name 71 that is "WS_B" is input through the input dialog 300. The dividing unit 22 sets the workspace name 71 that is "WS_B" in the division-destination-workspace-related workspace information 7. The dividing unit 22 generates the workspace ID 72 that is "BBB" and sets it in the division-destination-workspace-related workspace information 7.

FIG. 9 is a diagram illustrating the object information list 73 immediately after having been set in WS_B workspace information 7. As illustrated in FIG. 9, immediately after a WS_B object information list 73 is generated, no entry is registered because a division of the workspace has not yet been reflected in the object information list 73.

Subsequent to the process at Step S5, the dividing unit 22 performs the processes at Steps S6 to S12 so as to change specifics in a WS_A object information list 73 and in the WS_B object information list 73 according to the completion of a division of the workspace. FIG. 10 is a diagram illustrating the WS_B object information list 73 in a state where a division of the workspace is completed. FIG. 11 is a diagram illustrating the WS_A object information list 73 in a state where a division of the workspace is completed. The processes at Steps S6 to S12 are described below.

The dividing unit 22 copies separation-target object information among the object information registered in the object information list 73 in FIG. 4 to the WS_B object information list 73 (Step S6). In this example, object information of the controller CONT_B (that is, object information with the object ID "3") is a target of the copying.

The dividing unit 22 registers object information of a jump object in the WS_B object information list 73 (Step S7).

The dividing unit 22 sets the object ID and connection information in the WS_B object information list 73 (Step S8). The object information of the controller CONT_B, copied to the WS_B object information list 73, is registered initially in the WS_B object information list 73. Therefore, this object information is assigned the object ID "1" in the WS_B object information list 73 by the dividing unit 22. The object information of a jump object is registered secondly in the WS_B object information list 73. Therefore, this object information is assigned the object ID "2" by the dividing unit 22. The jump object is an object indicating the boundary generated by dividing the workspace. Therefore, a connection destination of the jump object added to the WS_B object information list 73 is the controller CONT_B that is a device included in a WS_B control system and that is to be connected to a device included in a WS_A control system after dividing the workspace. Therefore, the dividing unit 22 records the object ID "1" of the controller CONT_B in the connection information of the jump object and also records the object ID "2" of the jump object in the connection information of the controller CONT_B.

The dividing unit 22 sets the jump-destination information and the jump-destination ID in the WS_B object information list 73 (Step S9). That is, the dividing unit 22 records an object ID of a duplication-source object information list 73 in the jump-destination information included in a duplication-destination entry; and records the object ID of a duplication-source entry in the jump-destination ID included in the duplication-destination entry as information that identifies the duplication-source entry in the duplication-source object information list 73. The dividing unit 22 records the object ID of the duplication-source object information list 73 in the jump-destination information of the jump object. In this example, the dividing unit 22 records "AAA" that is the workspace ID 72 of a division-source workspace both in the jump-destination information of the controller CONT_B and in the jump-destination information of the jump object. Further, the dividing unit 22 records, in the jump-destination ID of the controller CONT_B, the object ID (that is, "3") of the object information of the controller CONT_B that is a copy source in the WS_A object information list 73.

The dividing unit 22 then changes the object type of the object information of the controller CONT_B that is a copy source to a jump object in the WS_A object information list 73 (Step S10), that is, the dividing unit 22 rewrites the object type of the controller CONT_B from "CONT" to "JUMP".

The dividing unit 22 sets the jump-destination information and the jump-destination ID of the jump object in the WS_A object information list 73 (Step S11). That is, the dividing unit 22 records the object ID of a duplication-destination object information list 73 in the jump-destination information included in the duplication-source entry, and records the object ID of the duplication-destination entry in the jump-destination ID included in the duplication-source entry as information that identifies the duplication-destination entry in the duplication-destination object information list 73. In this example, the dividing unit 22 records "BBB", which is the workspace ID 72 of the division-destination workspace, in the jump-destination information of the controller CONT_B that has been changed to a jump object. Further, the dividing unit 22 records, in the jump-destination ID of the controller CONT_B that has been changed to a jump object, the object ID (that is "1") of copy-destination object information in the WS_B object information list 73.

After the process at Step S11, the system-configuration displaying and editing unit 21 then executes control. The system-configuration displaying and editing unit 21 refreshes a division-source workspace display screen 101 and a division-destination workspace display screen 101 (Step S12). The division-related process is then completed. The refreshing process at Step S12 is performed on the basis of each of the WS_A object information list 73 and the WS_B object information list 73.

In FIG. 7, a workspace display screen 101-2 displays a refreshed WS_A workspace after dividing the workspace; and a workspace display screen 101-3 displays a refreshed WS_B workspace after dividing the workspace. On the workspace display screen 101-2, the object 203 indicating a controller named "CONT_B" is replaced with an object 204 indicating a jump object named "CONT_B". On the workspace display screen 101-3, an object 205 named "CONT_B" is displayed, which is the same as the object 203 displayed on the workspace display screen 101-1. Further, on the workspace display screen 101-3, an object 206 that is a jump object is displayed, and the object 205 and the object 206 are connected.

An operator causes the WS_B workspace information 7 to be saved in a designated save-location path, and then the WS_B workspace information 7 can be provided to others so as to request development of the controller CONT_B. A person who receives the WS_B workspace information 7 (a requestee operator (a user)) starts the system development program 8 on a computer, and therefore the computer can be caused to achieve the functions of the system development device 1. A requester operator and a requestee operator can use different computers to achieve the functions of the system development device 1. It is satisfactory if a requester operator provides the WS_B workspace information 7 to a requestee operator through a network such as the Internet, or provides the WS_B workspace information 7 to a requestee operator through a removable memory device. By inputting a command to read the WS_B workspace information 7, the requestee operator can cause the system development device 1 for the requestee operator to draw the workspace display screen 101-3. On the workspace display screen 101-3, information of the destination to which the controller CONT_B is connected is hidden by the object 206 indicating a jump object. Therefore, a requester operator can hide the system configuration with the exception of the controller CONT_B from a requestee operator.

A requestee operator performs development of the controller CONT_B, and can transfer the WS_B workspace information 7 after the development to a requester operator. The requester operator can merge the WS_A workspace after dividing the workspace and the WS_B workspace after the development with each other.

Figure 12:
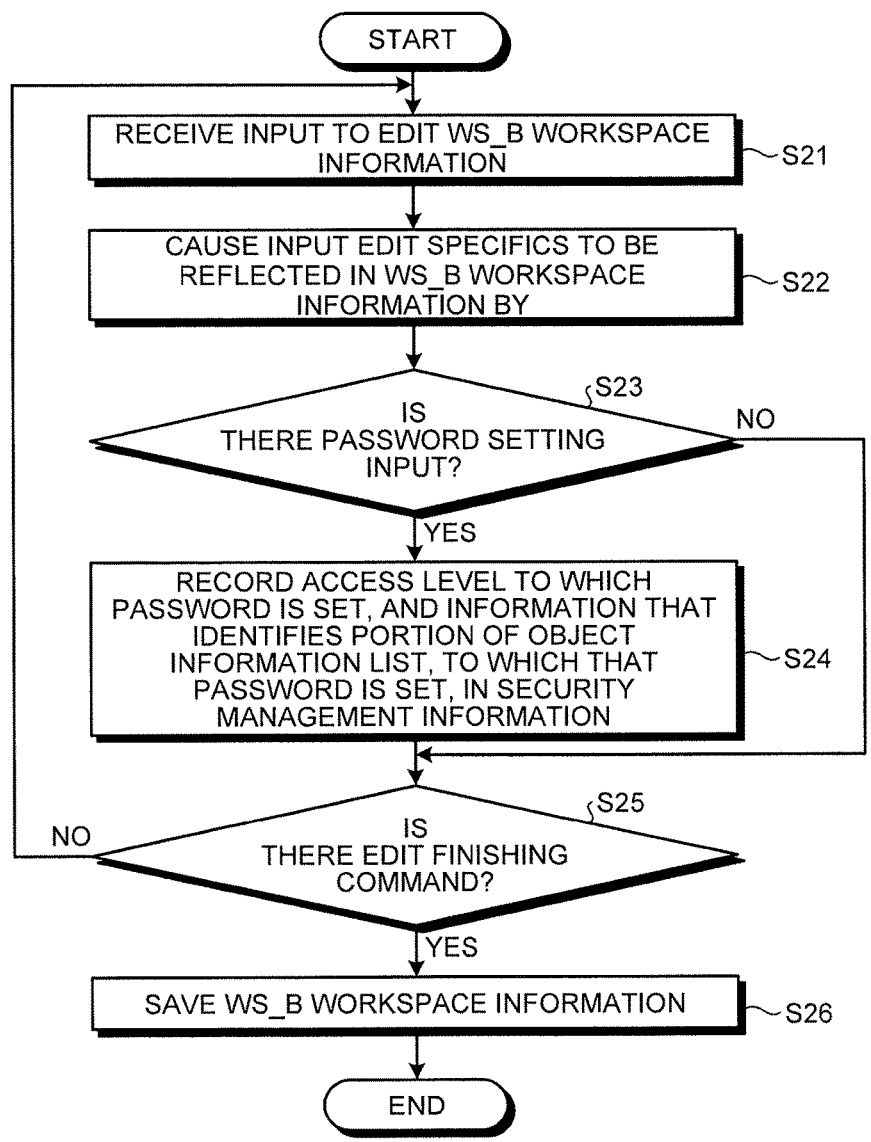
FIG. 12 is a flowchart describing an operation of the system development device when a control system is developed.

FIG. 12 is a flowchart describing an operation of the system development device 1 when the controller CONT_B is developed. In this flowchart, development of the controller CONT_B is described as being executed by a requestee operator. When the system-configuration displaying and editing unit 21 receives an input for editing the WS_B workspace information 7 through the workspace display screen 101-3 (Step S21), the system-configuration displaying and editing unit 21 performs an editing process that causes the input edit specifics to be reflected in the workspace information 7 (Step S22). An operator (a requestee operator) can set a password to any portion or all of the object information list 73 depending on the access level. The access level includes, for example, a level at which both reading and writing are permitted, a level at which both reading and writing are prohibited, and a level at which only reading is permitted. The system-configuration displaying and editing unit 21 determines whether there is a password setting input (Step S23). When there is a password setting input (YES at Step S23), the system-configuration displaying and editing unit 21 records the access level to which a password is set and information that identifies a portion of the object information list 73 to which the password is set in the security management information 75 (Step S24). When there is not a password setting input (NO at Step S23), or after the process at Step S24, the system-configuration displaying and editing unit 21 determines whether an edit finishing command is issued (Step S25). When an edit finishing command is issued (YES at Step 25), the system-configuration displaying and editing unit 21 saves the WS_B workspace information 7 (Step S26) and finishes operating. When an edit finishing command is not issued (NO at Step S25), the process at Step S21 is performed.

Figure 13:
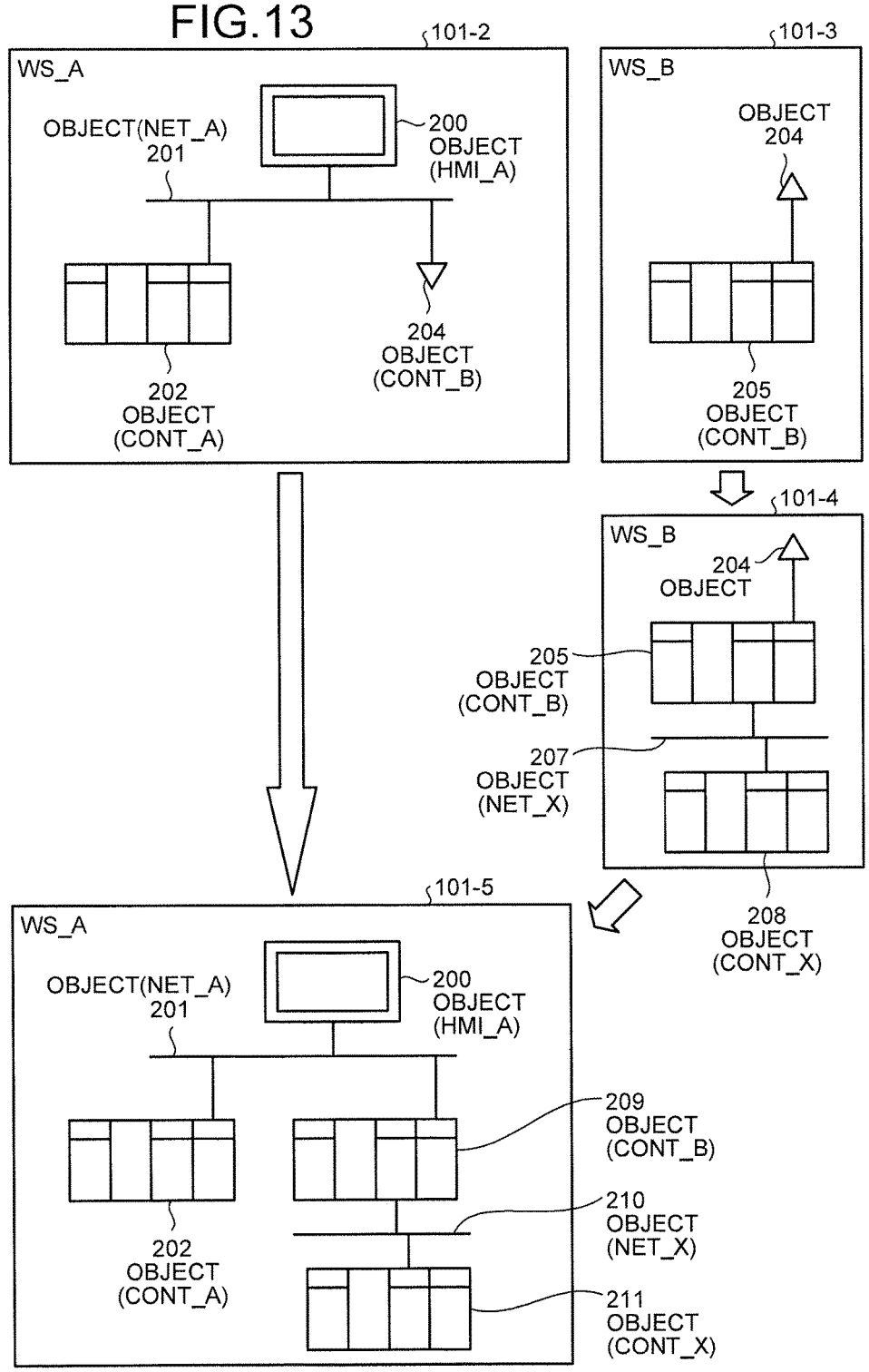
FIG. 13 is an explanatory diagram of a state of a workspace display screen transitioning from dividing until merging.

FIG. 13 is an explanatory diagram of a state of the workspace display screen 101 transitioning after dividing a workspace until merging the workspace. In FIG. 13, a workspace display screen 101-4 displays a WS_B workspace after the development. As illustrated in FIG. 13, after the development, an object 207 indicating a network named "NET_X" and an object 208 indicating a controller named "CONT_X" are added. The object 205 and the object 208 are connected to the object 207.

FIG. 14 is a diagram illustrating the object information list 73 corresponding to the WS_B workspace after the development. The object information list 73 after the development illustrated in FIG. 14 has a configuration in which, in the object information list 73 illustrated in FIG. 10 in a state where a division of a workspace has completed (that is, before the development); object information of the object 208 is registered as an entry with the object ID "3"; and object information of the object 207 is registered as an entry with the object ID "4".

Figure 15:
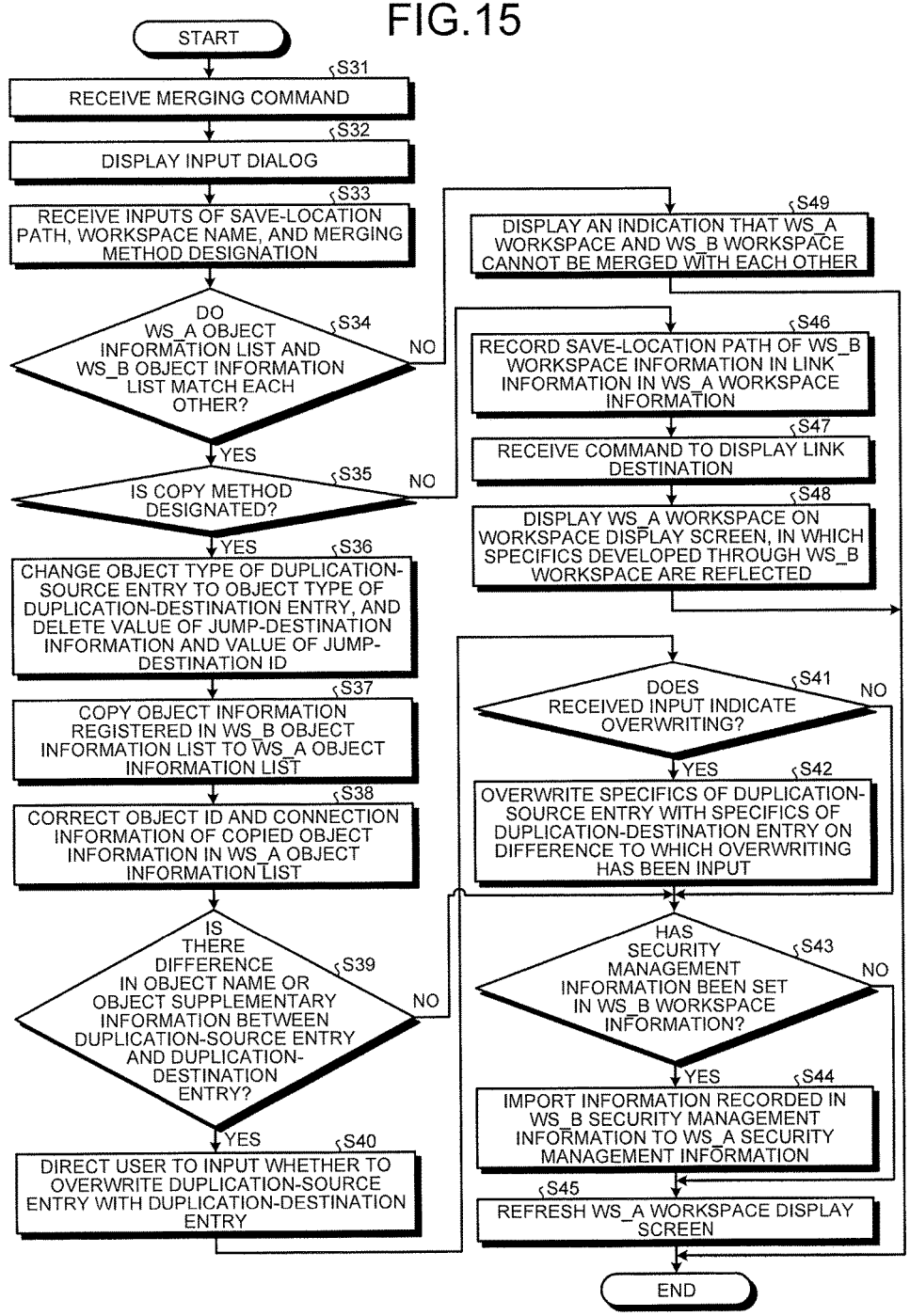
FIG. 15 is a flowchart describing an operation of the system development device for merging a workspace.

FIG. 15 is a flowchart describing an operation of the system development device 1 to merge a workspace. In this flowchart, a case is described where a requester operator regards a WS_B workspace after the development, which has been delivered from a requestee, as a merging target and regards a WS_A workspace as a merging destination. The workspace display screen 101-2 in FIG. 13 displays the WS_A workspace, which is a merging destination. This workspace display screen 101-2 corresponds to the object information list 73 in FIG. 11. The workspace display screen 101-4 in FIG. 13 displays the WS_B workspace after the development, which is a merging target. This workspace display screen 101-4 corresponds to the object information list 73 in FIG. 14.

The system-configuration displaying and editing unit 21 displays the workspace display screen 101-2, and it recognizes that the WS_A workspace is a merging destination. In this state, the system-configuration displaying and editing unit 21 can receive a merging command from an operator. When the system-configuration displaying and editing unit 21 receives a merging command (Step S31), the merging unit 23 then executes control. The merging unit 23 then displays an input dialog for designating a merging target on the main screen 100 (Step S32).

Figure 16:
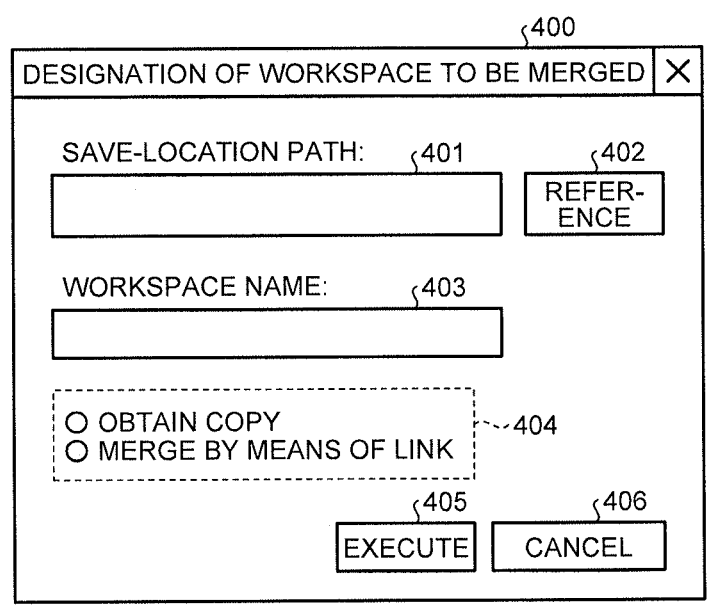
FIG. 16 is a diagram illustrating a display example of the input dialog.

FIG. 16 is a diagram illustrating a display example of the input dialog. As illustrated in FIG. 16, an input dialog 400 includes a save-location-path input field 401, a reference button 402, a workspace-name input field 403, a method-designation receiving unit 404, an execution button 405, and a cancel button 406. The WS_B workspace after the development is held in a storage device in the system development device 1 for a requester operator. The operator can input a save-location path of the WS_B workspace after the development to the save-location path input field 401. The reference button 402 is a button that instructs that a directory configuration of the storage device be displayed. By pressing the reference button 402, an operator causes the merging unit 23 to display the directory configuration of the storage area of the system development device 1 for reference to decide the save-location path. Further, the operator can input the workspace name 71 of the WS_B workspace after the development to the workspace-name input field 403. Furthermore, as a merging method, the operator can designate one of a method to obtain a copy of a division-destination workspace into a division-source workspace and a method to merge a division-destination workspace into a division-source workspace by means of a link. The operator can input a desired merging method to the method-designation receiving unit 404. The merging unit 23 triggers a press of the execution button 405 to receive specifics input to the save-location-path input field 401, to the workspace-name input field 403, and to the method-designation receiving unit 404. When the cancel button 406 is pressed, the dividing unit 22 can delete a display of the input dialog 400 and transfer control to the system-configuration displaying and editing unit 21.

When the merging unit 23 receives the inputs of the save-location path, the workspace name 71, and the merging-method designation through the input dialog 400 (Step S33), the merging unit 23 determines whether the WS_A object information list 73 and the WS_B object information list 73 match each other (Step S34). In the process at Step S34, the merging unit 23 can identify a duplication-destination entry from the duplication-source object information list 73 on the basis of the jump-destination information and the value of the jump-destination ID, and it can also identify a duplication-source entry from the duplication-destination object information list 73. The merging unit 23 then performs a matching determination by determining whether the duplication-destination entry and the duplication-source entry correspond to each other.

For example, the merging unit 23 extracts an entry, in which "BBB" is recorded in the jump-destination information and a value is recorded in the jump-destination ID from the WS_A object information list 73. The merging unit 23 then extracts an entry, in which "AAA" is recorded in the jump-destination information and a value is recorded in the jump-destination ID, from the WS_B object information list 73. When conditions are satisfied, that is, when the jump-destination ID of one of the two extracted entries corresponds with the object ID of the other entry and the jump-destination ID of the other entry corresponds with the object ID of the one entry, the merging unit 23 will determine that the WS_A object information list 73 and the WS_B object information list 73 match each other in the determination process at Step S34. When the conditions described above are not satisfied, or when extraction of the entries fails, the merging unit 23 will determine that these object information lists 73 do not match each other in the determination process at Step S34. For example, the entry with the object ID "3" is extracted from the WS_A object information list 73 illustrated in FIG. 11. The entry with the object ID "1" is extracted from the WS_B object information list 73 illustrated in FIG. 14. "1" is recorded in the jump-destination ID of the entry with the object ID "3" extracted from the WS_A object information list 73. "3" is recorded in the jump-destination ID of the entry with the object ID "1" extracted from the WS_B object information list 73. Therefore, the object information lists 73 in FIG. 11 and in FIG. 14 match each other.

In the following descriptions, among the entries used for a matching determination in the process at Step S34, an entry extracted from the WS_A object information list 73 is referred to as "duplication-source entry", and an entry extracted from the WS_B object information list 73 is referred to as "duplication-destination entry".

When both the object information lists 73 match each other (YES at Step S34), the merging unit 23 determines whether a copy method is designated through the method-designation receiving unit 404 (Step S35). When the copy method is designated (YES at Step S35), the merging unit 23 changes the object type of the duplication-source entry to the object type of the duplication-destination entry, and it also deletes the value of the jump-destination information and the value of the jump-destination ID from the duplication-source entry (Step S36). Because of this operation, in the WS_A object information list 73, the object type of the entry with the object ID "3" is changed from "JUMP" to "CONT_B", and the jump-destination information and the value of the jump-destination ID of the entry with the object ID "3" are deleted.

The merging unit 23 copies the object information registered in the WS_B object information list 73 to the WS_A object information list 73 (Step S37). However, at Step S37, the duplication-destination entry and a jump object in which a duplication-source workspace ID 72 is recoded in the jump-destination information are excluded from a target of the copy. In this example, object information, which is with the object ID "1" that is the duplication-destination entry and object information which is with the object ID "2" that is a jump object in which "AAA" is recorded in the jump-destination information, is excluded from being a target of the copy. Except for the duplication-destination entry, object information with the object ID "3" and object information with the object ID "4", which are added to the WS_B object information list 73, are targets of the copy. In the case where no object information is added to the WS_B object information list 73 aside from the duplication-destination entry, a copy is not executed in the process at Step S37.

The merging unit 23 then corrects the object ID of the copied object information to a value unique to the WS_A object information list 73, and it corrects the connection information according to the correction of the object ID in the WS_A object information list 73 (Step S38). In the case where the object ID of a duplication-destination entry is included in the connection information, the merging unit 23 corrects the value in this connection information to the object ID of a duplication-source entry.

The merging unit 23 then determines whether there is a difference in the object name or object supplementary information between the duplication-source entry and the duplication-destination entry (Step S39). When there is a difference therebetween (YES at Step S39), the merging unit 23 displays the difference on the main screen 100 and urges a user to input whether to overwrite the duplication-source entry with the duplication-destination entry (Step S40). When there are multiple differences therebetween, it is satisfactory if the merging unit 23 urges a user to input whether to execute the overwriting for each of the differences. For example, when there is a difference in network-setting information, the merging unit 23 displays the difference in network-setting information.

Upon reception of an input to overwrite (YES at Step S41), the merging unit 23 overwrites specifics of the duplication-source entry with specifics of the duplication-destination entry on a difference to which overwriting is input (Step S42). Upon reception of an input not to overwrite (NO at Step S41), the process at Step S42 is skipped.

In the manner as described above, the WS_A object information list 73 in a merging completion state is completed. FIG. 17 is a diagram illustrating the WS_A object information list 73 in a merging completion state.

After the process at Step S42, the merging unit 23 determines whether the security management information 75 has been set in the WS_B workspace information 7 (Step S43). When the security management information 75 has been set in the WS_B workspace information 7 (YES at Step S43), the merging unit 23 imports information, which is recorded in WS_B security management information 75, to WS_A security management information 75 (Step S44). In the process at Step S44, the information recorded in the WS_B security management information 75 is added to the WS_A security management information 75. In the case where the added specifics include an object ID, the object ID included in the added specifics is overwritten with a value corrected in the process at Step S38.

After the process at Step S44, the system-configuration displaying and editing unit 21 then executes control. The system-configuration displaying and editing unit 21 refreshes a WS_A workspace display screen 101 (Step S45). The merging-related process is then completed.

A workspace display screen 101-5 in FIG. 13 displays a WS_A workspace after completion of the merging. As illustrated in FIG. 13, on the workspace display screen 101-5, a jump object 204 is replaced with an object 209, an object 210, and an object 211 that correspond respectively to the object 205, the object 207, and the object 208 that are displayed on the workspace display screen 101-4.

In the case where a password is set to a portion or all of the WS_B workspace, security-related setting specifics are carried over to the merged WS_A workspace in the process at Step S44. The system-configuration displaying and editing unit 21 executes a control on a section of the object information list 73, to which a password is set, at an access level according to the password. For example, the system-configuration displaying and editing unit 21 masks a displayed section to which a password is set, and it displays this section after password authentication is completed. For another example, the system-configuration displaying and editing unit 21 prohibits edits of a section to which a password is set, and it permits edits of this section after password authentication is completed.

For example, in the case where, in the WS_B object information list 73, only reading of network-setting information among the object supplementary information is permitted and reading and writing of the other information is prohibited, the system-configuration displaying and editing unit 21 can display a special object indicating to the effect that reading is prohibited, instead of reading the object 209, the object 210, and the object 211.

When the copy method is not designated (NO at Step S35), that is, when the link method is designated, the merging unit 23 records a save-location path of the WS_B workspace information 7 in the link information 74 in the WS_A workspace information 7 (Step S46). The merging by means of a link is then completed.

After the process at Step S46, the system-configuration displaying and editing unit 21 then executes control. Even when the merging by means of a link is completed, the system-configuration displaying and editing unit 21 still displays the WS_A workspace on the workspace display screen 101 in the same state as immediately before the merging. That is, even after the process at Step S46 is completed, the system-configuration displaying and editing unit 21 still displays the workspace display screen 101-2 in FIG. 13. In this state, the system-configuration displaying and editing unit 21 can receive a command to display a link destination from an operator. While the command to display a link destination can be input in any format, an input by clicking the jump object 204 is applicable as the input method, for example.

Upon reception of the command to display a link destination (Step S47), the system-configuration displaying and editing unit 21 displays the WS_A workspace, in which specifics managed by the WS_B workspace are reflected, on the workspace display screen 101 (Step S48). That is, the system-configuration displaying and editing unit 21 displays the object 209, the object 210, and the object 211 that constitute the WS_B control system instead of displaying the jump object 204. The merging-related process is then finished.

In the process at Step S48, the system-configuration displaying and editing unit 21 reads the WS_B workspace information 7 on the basis of the link information 74 in the WS_A workspace information 7, for example. The system-configuration displaying and editing unit 21 then refreshes the WS_A workspace on the basis of specifics, in which a duplication-source entry in the WS_A object information list 73 has been replaced with an entry that constitutes the WS_B object information list 73 included in the read WS_B workspace information 7. It is satisfactory if the system-configuration displaying and editing unit 21 performs an internal process identical to the process performed by the merging unit 23 when the copy method is selected, and therefore another object information list 73 as illustrated in FIG. 17 is temporarily created in addition to the WS_A object information list 73 in order to display the WS_A workspace on the basis of the temporary object information list 73.

In the determination process at Step S34, when both the object information lists 73 do not match each other (NO at Step S34), the merging unit 23 displays an indication to the effect that the WS_A workspace and the WS_B workspace cannot be merged with each other (Step S49). The merging-related process is then finished.

In the above descriptions, a save-location path, in which the storage area within the system development device 1 is a save location, is input to the save-location-path input field 301. However, it is satisfactory if a storage device connected through a network, or a storage area included in a computer, is input to the save-location-path input field 301 so as to save the division-destination workspace information 7 in the storage device connected through a network or in the storage area included in a computer. With this operation, the system development device 1 for a requester operator is capable of providing the WS_B workspace information 7 directly to a requestee's computer.

Similarly, it is satisfactory if a storage device connected through a network, or a storage area included in a computer, is input to from the save-location-path input field 401 so as to read the workspace information 7 of a merging target from the storage device connected through a network or from the computer. With this operation, the system development device 1 for a requester operator is capable of reading the WS_B workspace information 7 directly from a requestee's computer.

As described above, according to the embodiment of the present invention, the system development device 1 includes a storage unit (the RAM 3 and the ROM 4) that stores therein the object information list 73, in which an entry is registered for each constituent element that constitutes a single control system, where the entry includes an object type (type information) of a constituent element (a device and a network) that constitutes the control system, connection information in which a connection destination of the corresponding constituent element is described, and setting information that is set to the corresponding constituent element; the system-configuration displaying and editing unit 21 that generates a workspace display screen for each object information list 73, where on the basis of the connection information, the workspace display screen connects and displays a display object according to the object type of each entry registered in the object information list 73 and also receives an edit input to the display object, and that causes an edit input received through the workspace display screen to be reflected in a corresponding object information list 73; and the dividing unit 22 that, when the system-configuration displaying and editing unit 21 receives a dividing command designating any second system included in a first system, duplicates an entry of the second system, which is registered in the first object information list 73 of the first system, and generates the second object information list 73. With this configuration, an operator (a user) can cause the system development device 1 to divide a development environment by only inputting a dividing command. Therefore, an operator's workloads when dividing the control system into development segments is reduced as compared to the comparative example described above. That is, according to the present embodiment, the system development device 1, which can divide the control system into development segments via an easy input, can be obtained.

The system development device 1 further includes the merging unit 23 that replaces a duplication-source entry in the first object information list 73 with an entry that constitutes the second object information list 73 when the system-configuration displaying and editing unit 21 receives a merging command to merge the second system into the first system. With this configuration, an operator can cause the system development device 1 to merge multiple divided development environments with each other by only inputting a merging command. Therefore, the system development device 1 can be obtained by which an operator can easily merge the development segments of the control system with each other.

The dividing unit 22 records jump-destination information and a jump-destination ID as the first information that brings a duplication-destination entry into correspondence with an duplication-source entry in the first object information list 73. The dividing unit 22 also records jump-destination information and a jump-destination ID as the second information that brings the duplication-source entry into correspondence with the duplication-destination entry in the second object information list 73. With this operation, the merging unit 23 can identify the duplication-source entry and the duplication-destination entry.

Further, the merging unit 23 confirms whether there is a difference between the duplication-destination entry and the duplication-source entry before overwriting the duplication-source entry with the duplication destination entry. When there is a difference therebetween, the merging unit 23 directs a user to determine whether to apply the difference. When it is determined to apply the difference, the merging unit 23 overwrites the duplication-source entry with the duplication-destination entry on the difference portion. When it is determined not to apply the difference, the merging unit 23 does not execute the overwriting on the difference portion. With this operation, when there is a different portion in, for example, the object name or setting information between a duplication-destination entry and a duplication-source entry, a requester operator can execute merging while checking whether a portion has been changed by a requestee operator.

The setting information included in an entry includes network-setting information. With this information, a requester operator can easily recognize whether there is a change in the network-setting information made by a requestee operator. This can prevent the occurrence of a case where a device connected to a network does not operate due to a change in the network-setting information.

When generating the second object information list 73, the dividing unit 22 adds a boundary entry (a jump-object entry) to the second object information list 73, where the boundary entry includes connection information indicating that its connection destination is a device included in the second system and is to be connected to the first system after dividing the workspace and includes type information indicating a divided boundary. With this operation, the system-configuration displaying and editing unit 21 can display the jump object indicating the boundary with the first system on a second-system workspace display screen 101.

Further, when generating the second object information list 73, the dividing unit 22 changes the type information of a duplication-source entry to the type information indicating a divided boundary. With this operation, the system-configuration displaying and editing unit 21 can display the jump object for a portion separated into the second system on a first-system workspace display screen 101.

The case has been described where a single device (the controller CONT_B in this example) is a separation target. However, note that there can also be a case where there is a plurality of devices, with the devices being connected to each other and being separation targets. In the case where the devices connected to each other are separation targets, the object type of their corresponding objects is changed to a jump object. It is satisfactory, if jump-destination information of a plurality of jump objects connected to each other is identical to each other, the system-configuration displaying and editing unit 21 displays these jump objects connected to each other in a state of a single merged object.

Further, when the system-configuration displaying and editing unit 21 receives a merging command to merge the second system into the first system, the merging unit 23 brings the link information 74, in which a save-location path of the second object information list 73 is described, into correspondence with the first object information list 73. As an example of the correspondence, the merging unit 23 records the link information 74 in the workspace information 7 that is the same as for the object information list 73. When displaying the first-system workspace display screen 101 after the link information 74 is brought into correspondence with the first object information list 73, the system-configuration displaying and editing unit 21 reads the second object information list 73 on the basis of the link information 74 and displays the first-system workspace display screen 101 on the basis of specifics in which a duplication-source entry included in the first object information list 73 has been replaced with an entry that constitutes the second object information list 73. With this configuration, an operator can cause the system development device 1 to merge multiple divided development environments with each other by only inputting a merging command. Therefore, the system development device 1 can be obtained by which an operator can easily merge the development segments of the control system with each other. Further, even when the second object information list 73 is edited after the merging, the system development device 1 does not need a merging command for each edit made to the second object information list 73, but it can display the workspace display screen 101 in which the edits made to the second object information list 73 are reflected.

The object information list 73 is configured such that it is possible to set a password for all or any portion of the object information list 73. The system-configuration displaying and editing unit 21 hides a display of a portion for which the password is set and displays the portion for which the password is set after password authentication is completed. With to this operation, it is possible for a requestee operator to deliver the workspace information 7 to a requester operator, while hiding a certain portion from the requester operator.

The system-configuration displaying and editing unit 21 prohibits edits of a portion for which a password is set, and it permits editing the portion for which the password is set after password authentication is completed. With this operation, it is possible for a requestee operator to deliver the workspace information 7 to a requester operator, while prohibiting the requester operator from editing a certain portion.

INDUSTRIAL APPLICABILITY

As described above, the system development device, the system development method, and the system development program according to the present invention can be appropriately applied to a system development device, a system development method, and a system development program that support development of a control system used in the field of FA.

REFERENCE SIGNS LIST

1 system development device, 2 CPU, 3 RAM, 4 ROM, 5 input device, 6 display device, 7 workspace information, 8 system development program, 21 system-configuration displaying and editing unit, 22 dividing unit, 23 merging unit, 71 workspace name, 72 workspace ID, 73 object information list, 74 link information, 75 security management information, 100 main screen, 101 workspace display screen, 200 to 211 object, 300, 400 input dialog, 301, 401 save-location-path input field, 302, 402 reference button, 303, 403 workspace-name input field, 304 save button, 305, 406 cancel button, 404 method-designation receiving unit, 405 execution button.

The invention claimed is:

1. A system development device that supports development of a system configured by connecting a plurality of constituent elements to each other, wherein the plurality of constituent elements comprise a device to which setting information for controlling operation thereof is set, the system development device comprising:

a memory having a storage unit that stores therein constituent-element information lists, in each of which an entry is registered for each of the plurality of constituent elements that constitutes a single system, wherein the entry comprises type information of a constituent element, connection information in which a connection destination of the corresponding constituent element is described, and setting information that is set to the corresponding constituent element;

a controller having a system-configuration displaying and editing unit that generates a display screen for each of the constituent-element information lists, wherein the display screen is connecting and displaying a display object according to the type information of each entry registered in the constituent-element information list based on the connection information, that receives an edit input to the display object, and that reflects an edit input received through the display screen in a corresponding constituent-element information list; and wherein, in response to the system-configuration displaying and editing unit receiving a dividing command, the controller executes a dividing unit, which when executed is configured to:

determine a first constituent element from among the plurality of constituent elements of a first system having a first constituent-element list from among the constituent-element information lists, based on the dividing command which designates the first constituent element as a separate target;

generates a second constituent-element information list for a second system, which is the separate target designated in the dividing command;

duplicates the first constituent element and adds, to the generated second constituent-element information the duplicated first constituent element as a second constituent element, which is a first element in the generated second constituent-element information list, generates and adds a third constituent element to the second constituent-element information list, which indicates a connection between the first constituent element and the second constituent element, and updates an object type of the first constituent element in the first constituent-element information list.

2. The system development device according to claim 1, further comprising a merging unit that replaces a duplication-source entry with an entry that constitutes the second constituent-element information list when the system-configuration displaying and editing unit receives a merging command to merge the second system into the first system.

3. The system development device according to claim 2, wherein:

the merging unit, when the system-configuration displaying and editing unit receives a merging command to merge the second system into the first system, identifies a duplication-destination entry and a duplication-source entry based on the first information and the second information, and overwrites the identified duplication-source entry with the identified duplication-destination entry, and the merging unit, when the second constituent-element information list includes a new additional entry different from the identified duplication-destination entry, duplicates the corresponding additional entry and adds it to the first constituent-element information list.

4. The system development device according to claim 3, wherein the merging unit, before overwriting the identified duplication-destination entry with the identified duplication-source entry, determines whether there is a difference between the identified duplication-source entry and the identified duplication-destination entry, and the merging unit, when there is the difference, directs a user to determine whether to apply the difference, executes overwriting on a portion with the difference when the difference is determined to be applied, and does not execute overwriting on a portion with the difference when the difference is determined not to be applied.

5. The system development device according to claim 4, wherein devices are connected through a network, and setting information that is set to the devices includes network-setting information for connecting to the network.

6. The system development device according to claim 4, wherein setting information that is set to the devices includes a program that operates the corresponding devices.

7. The system development device according to claim 2, wherein the system-configuration displaying and editing unit displays, on the display screen, setting information designated by a user among setting information recorded in the constituent-element information list.

8. The system development device according to claim 7, wherein the constituent-element information list is configured such that it is possible to set a password for all or any portion of the constituent-element information list, and the system-configuration displaying and editing unit hides a display of a portion for which the password is set and displays the portion for which the password is set after password authentication is completed.

9. The system development device according to claim 7, wherein the constituent-element information list is configured such that it is possible to set a password for all or any portion of the constituent-element information list, and the system-configuration displaying and editing unit prohibits editing a portion for which the password is set and permits editing the portion for which the password is set after password authentication is completed.

10. The system development device according to claim 1, wherein the dividing unit, when the second constituent-element information list is generated, adds a boundary entry, which is the third constituent element, to the second constituent-element information list, the boundary entry including:

connection information indicating that connection destination is a device that is included in the second system and that is connected to the first system, and type information indicating a divided boundary.

11. The system development device according to claim 10, wherein the system-configuration displaying and editing unit, when a display screen is generated based on of the second constituent-element information list, connects a display object specific to type information indicating the boundary to the connection-destination device, and displays the display object.

12. The system development device according to claim 1, wherein the dividing unit, when the second constituent-element information list is generated, changes type information of a duplication-source entry to type information indicating a divided boundary.

13. The system development device according to claim 12, wherein the system-configuration displaying and editing unit, when a display screen is generated based on the first constituent-element information list in which type information of the duplication-source entry has been changed to type information indicating the divided boundary, changes a display object of the duplication-source entry to a display object specific to type information indicating the boundary and displays the changed display object.

14. The system development device according to claim 1, further comprising
a merging unit that brings link information, in which a save-location path of the second constituent-element information list is described, into correspondence with the first constituent-element information list when the system-configuration displaying and editing unit receives a merging command to merge the second system into the first system, wherein
the system-configuration displaying and editing unit, when a display screen of the first system is displayed after the link information is brought into correspondence with the first constituent-element information list,
reads the second constituent-element information list based on the link information, and
displays a display screen of the first system based on specifics in which a duplication-source entry included in the first constituent-element information list has been replaced with an entry that constitutes the read second constituent-element information list.

15. The system development device according to claim 14, wherein the dividing unit:
records first information that brings the duplication-destination entry into correspondence with the duplication-source entry in the first constituent-element information list, and
records second information that brings the duplication-source entry into correspondence with the duplication-destination entry in the second constituent-element information list, and
the system-configuration displaying and editing unit, when a display screen of the first system is displayed after the link information is brought into correspondence with the first constituent-element information list,
identifies a duplication-destination entry and a duplication-source entry based on the first information and second information that is brought into correspondence with the read second constituent-element information list,
replaces the identified duplication-source entry with the identified duplication-destination entry, and
displays, when the read second constituent-element information list includes a new additional entry different from the identified duplication-destination entry, a display screen of the first system based on specifics that are added to the corresponding added entry.

16. The system development device according to claim 14, wherein
the system-configuration displaying and editing unit displays, on the display screen, setting information designated by a user among setting information recorded in the constituent-element information list.

17. The system development device according to claim 1, further comprising:
a display displaying the display screen of the first system comprising the first constituent element displayed differently based on the updated object type and displaying a second screen of the generated second system comprising the second constituent element and the third constituent element,
wherein object types is selected from among a programmable logic controller (PLC) type, a human machine interface (HMI) device object type, a network object type, an auxiliary unit object type, and a jump object type.

18. The system development device according to claim 1, wherein the entry for said each of the plurality of constituent elements further comprises:
display information comprising an object color and object display position coordinates,
wherein the type information comprises an object type selected from among a programmable logic controller (PLC) type, a human machine interface (HMI) device object type, a network object type, an auxiliary unit object type, and a jump object type, and
wherein the third constituent element is a jump object comprising the connection information, jump destination, and a jump destination identifier.

19. The system development device according to claim 1, wherein each of the first constituent-element information list for the first system and the second constituent-element information list, comprises:
a first field indicating connection information between some of the plurality of constituent elements of the first system,
a second field indicating a jump destination information,
a third filed indicating an object type selected from among a programmable logic controller (PLC) type, a human machine interface (HMI) device object type, a network object type, an auxiliary unit object type, and a jump object type.

20. The system development device according to claim 1, wherein object types is selected from among a programmable logic controller (PLC) type, a human machine interface (HMI) device object type, a network object type, an auxiliary unit object type, and a jump object type and wherein each of the first constituent-element information list for the first system and the second constituent-element information list comprises a plurality of constituent elements representing devices in a system.

21. The system development device according to claim 1, wherein at least two of constituent elements from among the plurality of constituent elements represent devices in a network comprising at least one of a programmable logic controller device, a human machine interface device, and a network device.

22. A method for causing a computer to support development of a system configured by connecting a plurality of constituent elements to each other, where the plurality of constituent elements include a device to which setting information for controlling operations is set, the method comprising:
obtaining, by a computer, a first constituent-element information list, in which an entry is registered for each of the plurality of constituent elements that constitutes a first system, wherein the entry comprises type information of a constituent element, connection information in which a connection destination of the corresponding constituent element is described, and setting information that is set to the corresponding constituent element;
displaying, on a display of a display device, a display screen, wherein the display screen connects and displays, based on the connection information, a display object according to the type information for each entry registered in the first constituent-element information list, and receives an edit input for the display object;

causing, by the computer, an edit input received through the display screen to be reflected in the first constituent-element information list;

receiving, by the computer, a dividing command designating one of the plurality of constituent elements as a separate target; and in response to the receiving of the dividing command, executing the following operations:

determining, by the computer, a first constituent element from among the plurality of constituent elements of a first system, based on the dividing command which designates the first constituent element as the separate target, generating, by the computer, a second constituent-element information list for a second system, which is the separate target designated in the dividing command, duplicating, by the computer, the first constituent element and adding, by the computer, to the generated second constituent-element information list, the duplicated first constituent element as a second constituent element, which is first element in the generated second constituent-element information list, generating and adding, by the computer, a third constituent element to the second constituent-element information list, which indicates a connection between the first constituent element and the second constituent element, and updating, by the computer, an object type of the first constituent element in the first constituent-element information list.

23. A non-transitory computer readable medium storing a program for causing a computer to support development of a system configured by connecting a plurality of constituent elements to each other, wherein the plurality of constituent elements include a device to which setting information for controlling operations is set, the program causing the computer to execute:

obtaining a first constituent-element information list, in which an entry is registered for each of the plurality of constituent elements that constitutes a first system, wherein the entry comprises type information of a constituent element, connection information in which a connection destination of the corresponding constituent element is described, and setting information that is set to the corresponding constituent element;

displaying a display screen on a display device, wherein the display screen connects and displays, based on the connection information, a display object according to the type information for each entry registered in the first constituent-element information list, and receiving an edit input for the display object;

causing an edit input received through the display screen to be reflected in the first constituent-element information list;

receiving a dividing command designating one of the constituent elements as a separate target; and in response to the receiving of the dividing command, executing the following operations:

determining a first constituent element from among the plurality of constituent elements of a first system, based on the dividing command which designates the first constituent element as the separate target, generating a second constituent-element information list for a second system, which is the separate target designated in the dividing command, duplicating the first constituent element and adding to the generated second constituent-element information list, the duplicated first constituent element as a second constituent element, which is a first element of the generated second constituent-element information list, generating and adding a third constituent element to the second constituent-element information list, which indicates a connection between the first constituent element and the second constituent element, and updating an object type of the first constituent element in the first constituent-element information.

\* \* \* \* \*